United States Patent
Bai

(10) Patent No.: US 10,498,703 B2
(45) Date of Patent: Dec. 3, 2019

(54) DATA SHARING METHOD FOR TERMINAL, DATA SHARING APPARATUS, AND TERMINAL

(71) Applicant: YULONG COMPUTER TELECOMMUNICATION SCIENTIFIC (SHENZHEN) CO., LTD., Shenzhen (CN)

(72) Inventor: Xiao-Long Bai, Shenzhen (CN)

(73) Assignee: YULONG COMPUTER TELECOMMUNICATION SCIENTIFIC (SHENZHEN) CO., LTD., Shenzhen (CN)

(*) Notice: Subject to any disclaimer, the term of this patent is extended or adjusted under 35 U.S.C. 154(b) by 245 days.

(21) Appl. No.: 15/495,991

(22) Filed: Apr. 25, 2017

(65) Prior Publication Data

US 2017/0230341 A1    Aug. 10, 2017

Related U.S. Application Data

(63) Continuation-in-part of application No. PCT/CN2015/071974, filed on Jan. 30, 2015.

(30) Foreign Application Priority Data

Dec. 23, 2014  (CN) .......................... 2014 1 0814836

(51) Int. Cl.
*H04L 29/06* (2006.01)
*G06F 21/60* (2013.01)
(Continued)

(52) U.S. Cl.
CPC ........ *H04L 63/0428* (2013.01); *G06F 21/606* (2013.01); *G06F 21/6218* (2013.01); *H04L 67/1097* (2013.01)

(58) Field of Classification Search
CPC . H04L 63/0428; H04L 6/1097; G06F 21/606; G06F 21/6218; G06F 12/14
See application file for complete search history.

(56) References Cited

U.S. PATENT DOCUMENTS 5,570,413 A * 10/1996 Ahlberg ................ H04M 1/663
                                                    379/199
7,320,076 B2 * 1/2008 Caronni .............. G06F 21/6218
                                                    713/193
(Continued)

FOREIGN PATENT DOCUMENTS

EP          1662356 A2    5/2006
WO       2014132246 A1    9/2014

*Primary Examiner* — Sher A Khan
(74) *Attorney, Agent, or Firm* — ScienBiziP, P.C.

(57) ABSTRACT

The present disclosure provides a data sharing method for a terminal, a data sharing apparatus and the terminal including a plurality of systems. The method includes: setting a data channel for communication between each two systems among the systems; when data needs to be shared between any two systems among the systems, performing a security detection on data to be shared through a data channel between the any two systems, to determine whether the data to be shared is security data; sharing the data to be shared through the data channel if the data to be shared is the security data, or prohibiting sharing the data to be shared if the data to be shared is not the security data. The present disclosure can realize communication between a security system and an ordinary system under the premise of ensuring that data in the security system has higher security.

11 Claims, 8 Drawing Sheets

(51) Int. Cl.
*G06F 21/62* (2013.01)
*H04L 29/08* (2006.01)

(56) References Cited

U.S. PATENT DOCUMENTS

| | | | | |
|---|---|---|---|---|
| 8,401,580 B2* | 3/2013 | Anzures | G06Q 30/02 | 455/3.06 |
| 8,458,451 B2* | 6/2013 | Shasha | G06F 11/1004 | 707/781 |
| 9,336,287 B2* | 5/2016 | Jordan | G06F 16/248 | |
| 2003/0051057 A1* | 3/2003 | Garnett | G06F 1/183 | 709/249 |
| 2003/0126458 A1* | 7/2003 | Teramoto | G06F 12/1466 | 713/194 |
| 2004/0139341 A1* | 7/2004 | Yamaguchi | G06F 21/14 | 713/194 |
| 2005/0047426 A1* | 3/2005 | Aaltonen | H04H 20/57 | 370/432 |
| 2006/0064739 A1* | 3/2006 | Guthrie | H04L 41/0686 | 726/3 |
| 2011/0161452 A1* | 6/2011 | Poornachandran | G06F 21/554 | 709/207 |
| 2012/0284513 A1* | 11/2012 | Yerli | G06F 21/53 | 713/168 |
| 2012/0311329 A1* | 12/2012 | Medina | H04L 51/04 | 713/168 |
| 2013/0205361 A1* | 8/2013 | Narayanaswamy | H04W 12/1208 | 726/1 |
| 2013/0283060 A1* | 10/2013 | Kulkarni | G06F 21/6218 | 713/189 |
| 2013/0294355 A1* | 11/2013 | Billonneau | H04L 65/605 | 370/329 |
| 2013/0318347 A1* | 11/2013 | Moffat | H04L 63/08 | 713/168 |
| 2014/0090055 A1* | 3/2014 | Palumbo | H04L 63/145 | 726/22 |
| 2014/0181267 A1* | 6/2014 | Wadkins | H04L 69/163 | 709/219 |
| 2015/0052221 A1* | 2/2015 | Yoon | H04W 8/00 | 709/217 |
| 2015/0271168 A1* | 9/2015 | Sheng | H04L 63/083 | 455/411 |

* cited by examiner

DATA SHARING METHOD FOR TERMINAL, DATA SHARING APPARATUS, AND TERMINAL

CROSS-REFERENCE TO RELATED APPLICATIONS

This application is a continuation-in-part of International Application No. PCT/CN2015/071974, filed on Jan. 30, 2015. This application claims priority of Chinese Patent Application No. 201410814836.5, entitled "data sharing method for terminal, data sharing apparatus and terminal," filed on Dec. 23, 2014 in the SIPO (State Intellectual Property Office of the People's Republic of China), the entire contents of which are incorporated by reference herein.

FIELD

The embodiments of the present disclosure relate to terminal technology field, and specifically to a data sharing method for a terminal, a data sharing apparatus for the terminal and the terminal.

BACKGROUND

Currently, in order to achieve security of data in a terminal, a terminal is generally configured with two or more systems, for example, a security system and a standard system are configured. Usages of some functions may be limited in the security system for security, such as disabling Wi-Fi, BLUETOOTH, and other communication functions or encrypting communication data, etc. The security system and the standard system are isolated from each other, that is, the security system and the standard system cannot communicate.

Isolation of the security system and the standard system greatly improves security of data in the security system, however, inconvenience is brought to a user for using. For example, if the user needs to send information in the standard system to a friend of the user through the security system, however, due to the isolation between the dual systems, the user cannot complete this operation.

However, if communication between the security system and the standard system is implemented simply, the standard system can have certain permissions to access the security system, thus data security in the security system is also threatened.

Therefore, under the premise of ensuring that data in a security system has higher security, how to realize communication between the security system and a common system becomes an urgent technical problem to be solved.

DETAILED DESCRIPTION

In order to more clearly understand the above objectives, features and advantages of the present disclosure, the present disclosure will be further described in detail in the following with reference to the accompanying drawings and embodiments. It should be noted that, embodiments of the present disclosure and features of the embodiments can be combined with each other, when there is no conflict.

Various details are described in the following descriptions for better understanding of the present disclosure, however, the present disclosure may also be implemented in other ways other than those described herein, accordingly, the scope of the present disclosure is not limited by the specific embodiments disclosed below.

A terminal of the present disclosure includes a plurality of systems.

Figure 1:
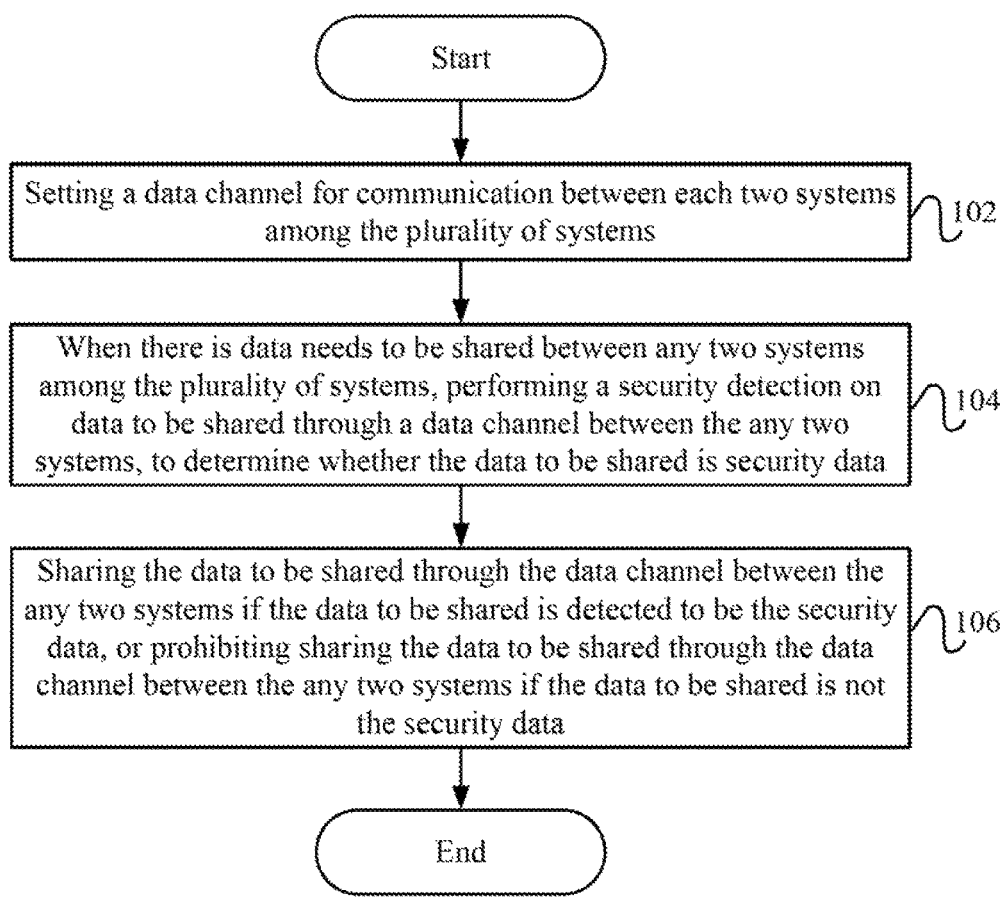
FIG. 1 illustrates a schematic flowchart of a data sharing method for a terminal according to one embodiment of the present disclosure.

FIG. 1 illustrates a schematic flowchart of a data sharing method for the terminal according to one embodiment of the present disclosure.

As shown in FIG. 1, according to one embodiment of the present disclosure, the data sharing method for the terminal includes: step 102, setting a data channel for communication between each two systems among the plurality of systems; step 104, when there is data needs to be shared between any two systems among the plurality of systems, performing a security detection on data to be shared through a data channel between the any two systems, to determine whether the data to be shared is security data; step 106, sharing the data to be shared through the data channel between the any two systems if the data to be shared is detected to be the security data, or prohibiting sharing the data to be shared through the data channel between the any two systems if the data to be shared is not the security data.

In the above technical scheme, by setting the data channel between each two systems for communication and performing the security detection on the data to be shared through the data channel between the any two systems when there is data needs to be shared between the any two systems, the data can be shared through a security channel only when the data to be shared is detected to be the secure data. On one hand, a problem that data sharing among systems cannot be realized in the related art is avoided, and on the other hand, a problem of leakage of privacy data in a system (e.g., a security system) while sharing data among the systems is also avoided. When the terminal has two systems, one system may be a security system, and the other system may be an ordinary system. By utilizing the technical scheme of the present disclosure, communication between the security system and the ordinary system can be realized under the premise of ensuring that data in the security system has higher security.

In the above technical scheme, preferably, the data channel set between each two systems includes a public storage area, and the step of sharing the data to be shared through the data channel between the any two systems includes: storing the data to be shared into the public storage area of the any two systems, to be read by the any two systems.

In the technical scheme, by storing the data to be shared into the public storage area of the any two systems, the any two systems can acquire them conveniently to realize data sharing. The public storage area includes one or more of: a public memory and public cloud storage space.

Certainly, the data channel set between the two systems may also be realized by a system broadcast.

In the above technical scheme, preferably, before sharing the data to be shared through the data channel between the any two systems, the data sharing method further includes: encrypting the data to be shared. By encrypting the data to be shared, the security of the data to be shared can be further ensured; moreover, it may be configured that only the encrypted data can be shared through the data channel, so as to avoid the data in the system from being shared maliciously through the data channel.

In the above technical scheme, preferably, before sharing the data to be shared through the data channel between the any two systems, the data sharing method further includes determining whether the data channel between the any two systems is opened; when the data channel between the any two systems is determined to be unopened, prohibiting sharing the data to be shared through the data channel between the any two systems, or prompting a user to open the data channel between the any two systems.

In the technical scheme, by determining whether the data channel between the two systems is opened and prohibiting sharing the data to be shared through the data channel when the data channel between the any two systems is determined to be unopened, data in the other systems can be avoided from being stolen by malicious programs. The user is prompted to open the data channel when the data channel between the any two systems is determined to be unopened, thus the user can be avoided from being affected due to the unopened data channel.

Figure 2:
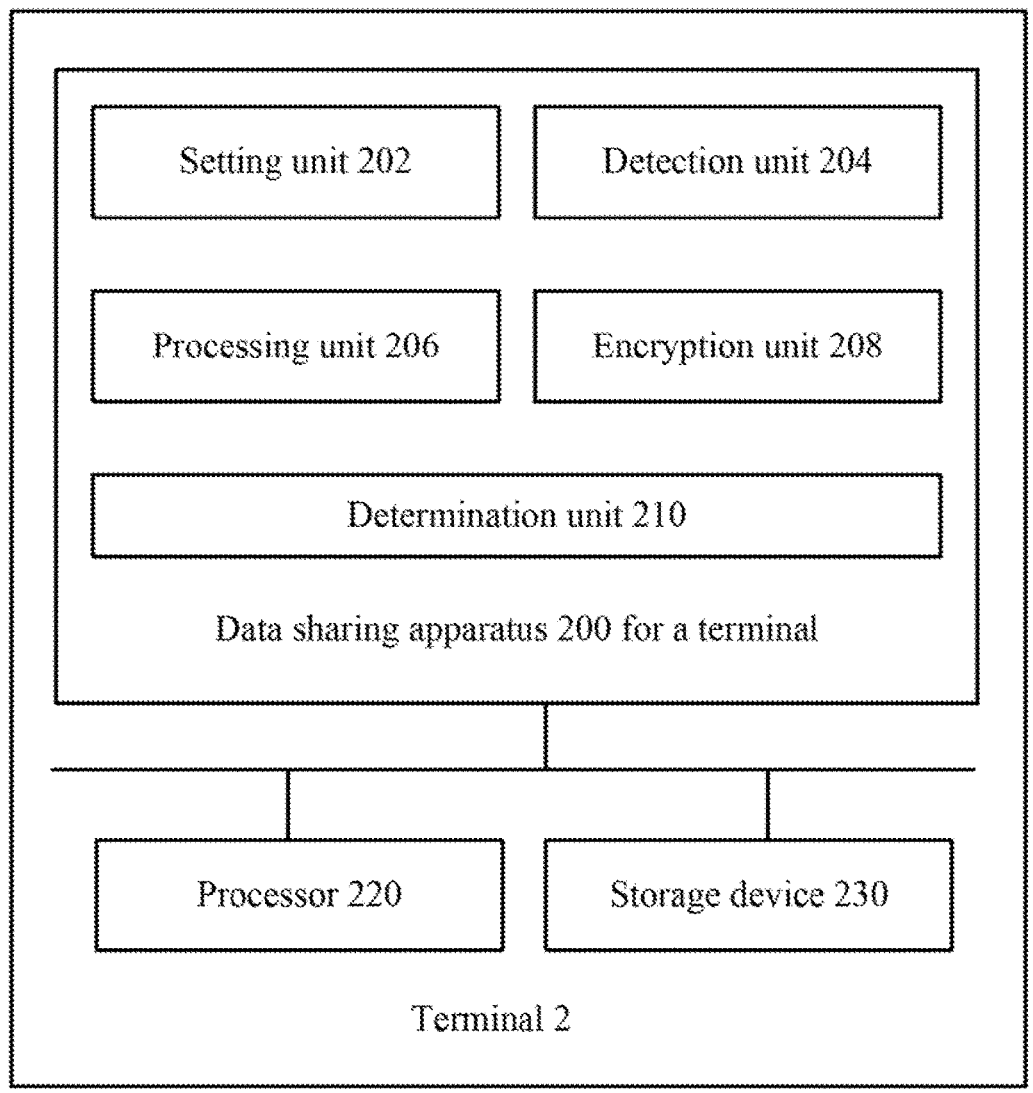
FIG. 2 illustrates a schematic structure diagram of a data sharing apparatus for the terminal according to one embodiment of the present disclosure.

FIG. 2 illustrates a schematic structure diagram of a data sharing apparatus for a terminal according to one embodiment of the present disclosure.

As shown in FIG. 2, according to one embodiment of the present disclosure, a terminal 2 including a data sharing apparatus 200 is provided. The data sharing apparatus 200 for the terminal 2 includes: a setting unit 202 used to set a data channel for communication between each two systems among the plurality of systems; a detection unit 204 used to perform a security detection on data to be shared through a data channel between any two systems when there is data needs to be shared between the any two systems among the plurality of systems, to determine whether the data to be shared is security data; a processing unit 206 used to share the data to be shared through the data channel between the any two systems when the detection unit 204 detects that the data to be shared is the security data, or prohibit sharing the data to be shared through the data channel between the any two systems if the detection unit 204 detects that the data to be shared is not the security data.

The word "unit" as used herein, refers to logic embodied in hardware or firmware, or to a collection of software instructions, written in a programming language, such as, for example, Java, C, or assembly. One or more software instructions in the function units may be embedded in firmware (e.g., the data sharing apparatus 200). It will be appreciated that the function units may include connected logic modules, such as gates and flip-flops, and may include programmable units, such as programmable gate arrays or processors. The function units described herein may be implemented as either software and/or hardware modules and may be stored in a storage device.

In one embodiment, the data sharing apparatus 200 can be a firmware, which may be installed in the terminal 2, which may be a mobile phone, a tablet computer, a personal digital assistant, a notebook computer, or other computing device. The terminal 2 further includes at least one processor 220 and a storage device 230. The at least one processor 220 is used to execute a plurality of units (e.g., the setting unit 202, the detection unit 204, for example) in the data sharing apparatus 200 and other applications, such as an operating system, installed in the terminal 2. The storage device 230 store the computerized instructions of a plurality of units in the data sharing apparatus 200, and one or more programs, such as the operating system and applications of the terminal 2. The storage device 230 can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example. In the above technical scheme, by setting the data channel between each two systems for communication and performing the security detection on the data to be shared through the data channel between the any two systems when there is data needs to be shared between the any two systems, the data can be shared through a security channel only when the data to be shared is detected to be the secure data. On one hand, a problem that data sharing among systems cannot be realized in the related art is avoided, and on the other hand, a problem of leakage of privacy data in a system (e.g., a security system) while sharing data among the systems is also avoided. When the terminal has two systems, one system may be a security system, and the other system may be an ordinary system. By utilizing the technical scheme of the present disclosure, communication between the security system and the ordinary system can be realized under the premise of ensuring that data in the security system has higher security.

In the above technical scheme, preferably, the data channel between each two systems, set by the setting unit 202, includes a public storage area; the processing unit 206 shares the data to be shared through the data channel between the any two systems by storing the data to be shared into the public storage area of the any two systems, to be read by the any two systems.

In the technical scheme, by storing the data to be shared into the public storage area of the any two systems, the any two systems can acquire them conveniently to realize data sharing. The public storage area includes one or more of: a public memory and public cloud storage space.

Certainly, the data channel set between the two systems may also be realized by a system broadcast.

The above technical scheme, preferably, further includes an encryption unit 208 used to encrypt the data to be shared before the processing unit 206 shares the data to be shared through the data channel between the any two systems.

In the technical scheme, by encrypting the data to be shared, the security of the data to be shared can be further ensured; moreover, it may be configured that only the encrypted data can be shared through the data channel, so as to avoid the data in the system from being shared maliciously through the data channel.

The above technical scheme, preferably, further includes a determination unit 210 used to determine whether the data channel between the any two systems is opened, before the processing unit 206 shares the data to be shared through the data channel between the any two systems; and the processing unit 206 is further used to prohibit sharing the data to be shared through the data channel between the any two systems or prompt a user to open the data channel between the any two systems, when the determination unit 210 determines that the data channel between the any two systems is unopened.

In the technical scheme, by determining whether the data channel between the two systems is opened and prohibiting sharing the data to be shared through the data channel when the data channel between the any two systems is determined to be unopened, data in the other systems can be avoided from being stolen by malicious programs. The user is prompted to open the data channel when the data channel between the any two systems is determined to be unopened, thus the user can be avoided from being affected due to the unopened data channel.

Combined with FIG. 3 to FIG. 8, a terminal with dual systems is provided below as an example to describe the technical scheme of the present disclosure in detail, the terminal with the dual systems includes a security system and a standard system.

The technical scheme of the present disclosure mainly designs a communication between the security system and the standard system to be realized through a secure channel (that is the above data channel), and implements opening or closing of the secure channel. Some criteria for filtering transmitted data can be set to the secure channel, to ensure the transmitted data not to affect the security of the security system.

Figure 3:
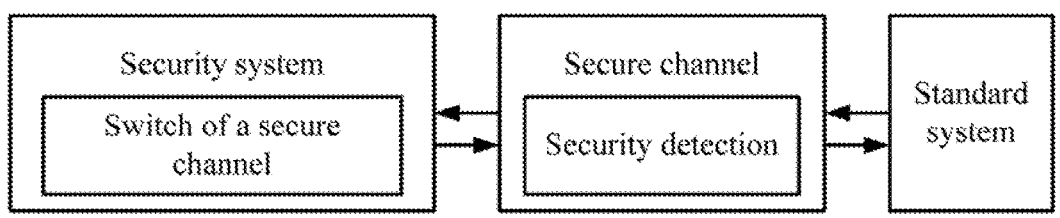
FIG. 3 illustrates a schematic diagram of a communication mode between a security system and a standard system according to one embodiment of the present disclosure.

As details shown in FIG. 3, the security system communicates with the standard system through the secure channel, the secure channel can perform a security detection on data transmitted between the two systems, and control a switch of the secure channel in the security system.

The secure channel is not fixed, it may belong to a certain system or be shared by both of the two systems. The switch of the secure channel may be in the security system, and also may be in the standard system, the switch in the security system is preferred as better meeting secure requirements. If the terminal has another system to communicate with the two systems, the secure channel can be set in the another system and opening and closing of the secure channel can be set in the another system; the security detection of the secure channel can filter out data having security risks, the communication between the systems can be selected to terminate or other customized operations can be performed if data to be shared between the systems is detected to have security risks.

Figure 4:
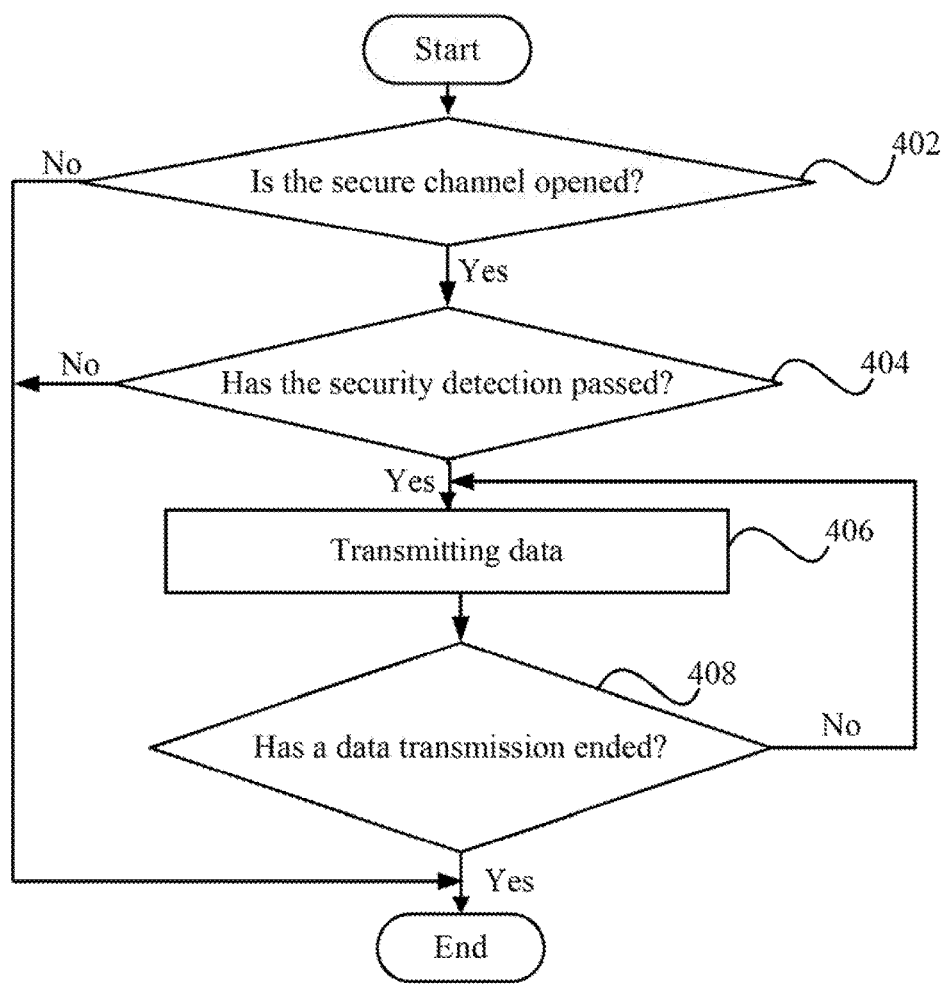
FIG. 4 illustrates a schematic flowchart of a data sharing method of a terminal having dual systems according to one embodiment of the present disclosure.

The above procedure can be referred to FIG. 4.

As shown in FIG. 4, according to one embodiment of the present disclosure, a data sharing method of a terminal having dual systems includes:

Step 402, determining whether the secure channel is opened. If the secure channel is opened, step 404 is executed. If the secure channel is unopened, the procedure ends.

Step 404, determining whether the security detection has passed. If the security detection has passed, step 406 is executed. If the security detection has not passed, the procedure ends.

Step 408, determining whether a data transmission has ended. If the data transmission has ended, the procedure ends. If data transmission has not ended, the procedure returns to step 406.

Implementation of the secure channel as mentioned above may use a manner of sharing memory (e.g., the public storage area), and also be realized by a system broadcast, or cloud transferring, and the like. In the following, the manner of sharing memory is adopted as an example to describe in detail.

Figure 5:
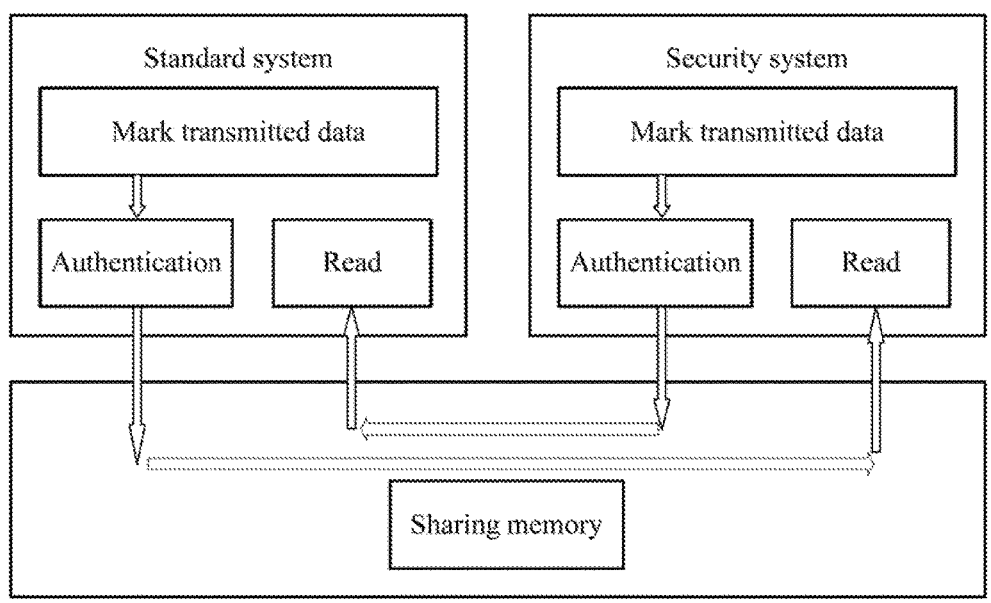
FIG. 5 illustrates a schematic diagram of another communication mode between the security system and the standard system according to another embodiment of the present disclosure.

As shown in FIG. 5, data sharing between the security system and the standard system is realized by the manner of sharing memory. In this embodiment, transmitted data can be marked before transmitting, such as encrypting etc. Data without encryption cannot be stored in the sharing memory, to prevent other data in the system(s), especially data in the security system, from being stored into the sharing memory maliciously, and to ensure the data security.

Figure 6:
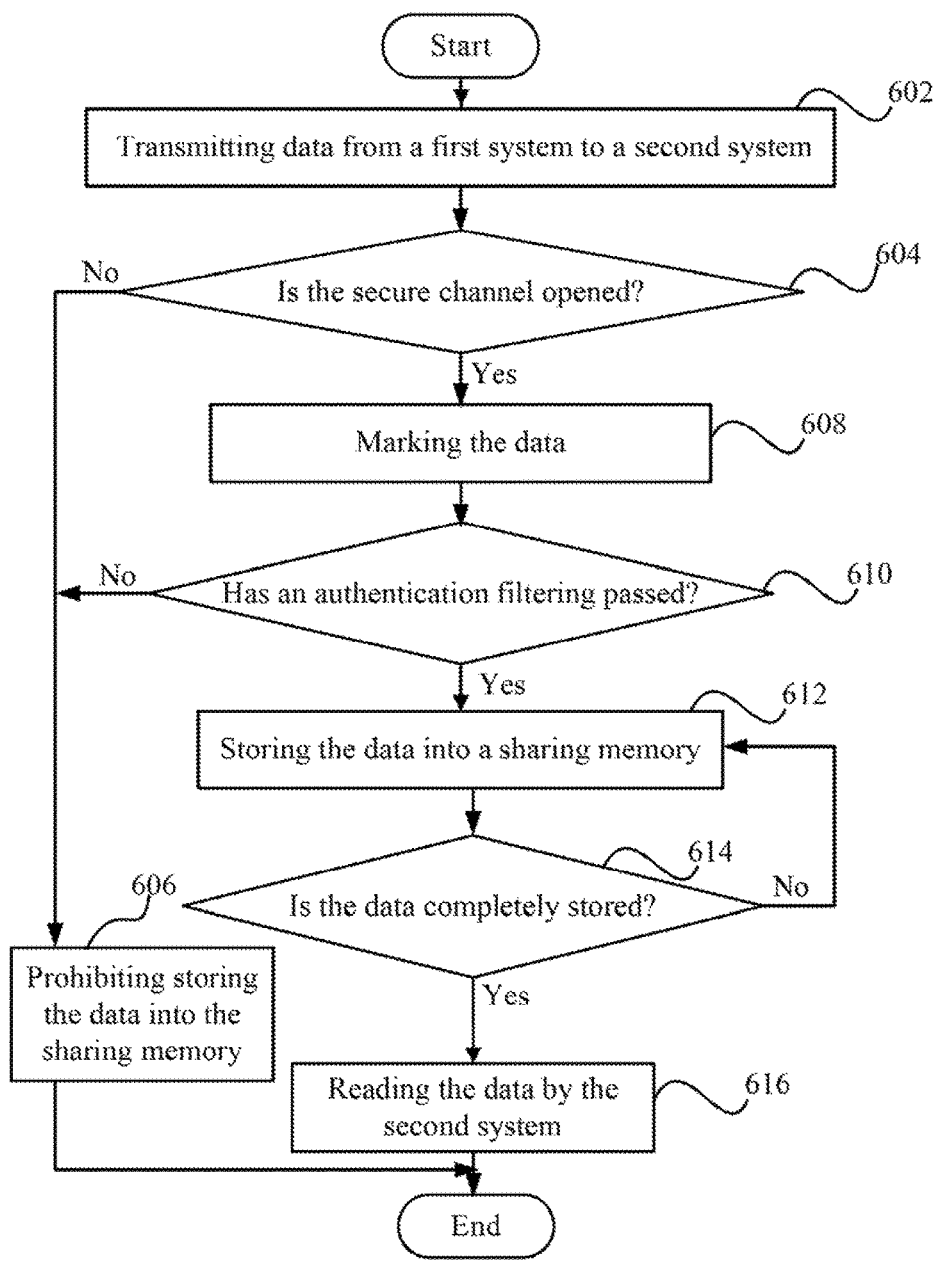
FIG. 6 illustrates a schematic flowchart of another data sharing method of the terminal having the dual systems according to another embodiment of the present disclosure.

A detailed procedure is shown in FIG. 6, according to another embodiment of the present disclosure, a data sharing method of the terminal having the dual systems includes:

Step 602, transmitting data from a first system to a second system.

Step 604, determining whether the secure channel is opened. If the secure channel is opened, step 608 is executed. If the secure channel is unopened, step 606 is executed. In other embodiments, when the secure channel is determined to be unopened, a prompt may be set to prompt the user whether to open the secure channel or not.

Step 606, prohibiting storing the data into the sharing memory.

Step 608, marking the data, such as encrypting the data etc.

Step 610, determining whether an authentication filtering has passed. If the authentication filtering has passed, step 612 is executed. If the authentication filtering has not passed, step 606 is executed.

Step 612, when the authentication filtering has passed, storing the data into the sharing memory.

Step 614, when it is determined that the data is completely stored, the second system reads the data.

A detailed embodiment of the present disclosure is provided below.

Figure 7:
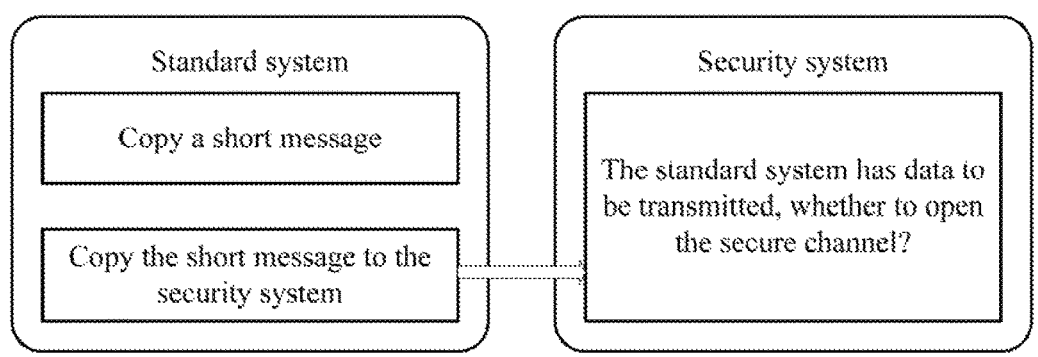
FIG. 7 and FIG. 8 illustrate schematic diagrams of sharing short message contents between the security system and the standard system according to one embodiment of the present disclosure.
Figure 8:
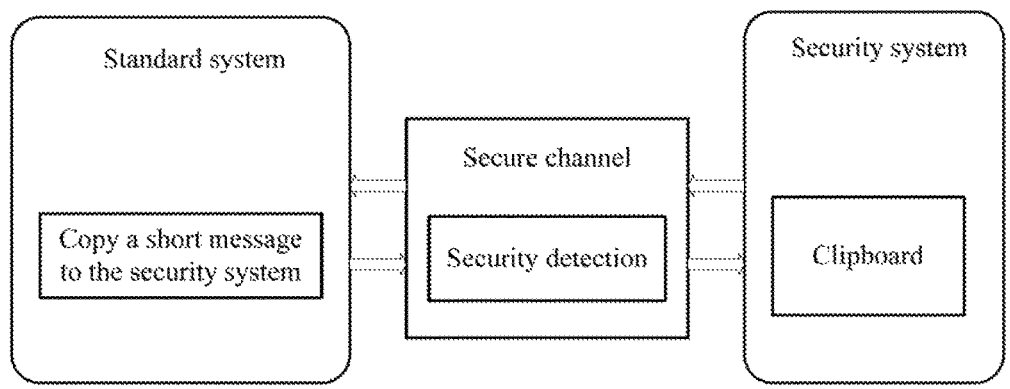

As shown in FIG. 7, when contents of one short message in the standard system needs to be copied to a new message in the security system, following options can be displayed in the standard system while copying the contents of the short message: a, copy a short message—put contents of the short message on a clipboard of the standard system; b, copy the short message to the security system—put the contents of the short message on a clipboard of the security system. When the user selects to put the contents of the short message in the security system, the security system pops up a prompt box to prompt that the standard needs to transmit data and whether to open the secure channel. As shown in FIG. 8, when the security system opens the secure channel, the contents of the short message is transmitted to the clipboard of the security system through the secure channel after passing a security detection. Moreover, if the security system denies to open the secure channel, information is sent to the standard system, and the standard system will prompt the user that the short message is failed to copy when the standard system receives the information, returned by the security system, indicating that the secure channel is denied to open.

In combination with the drawings, the present disclosure explicated above provides a novel data sharing scheme for a terminal, to solve a problem that data sharing among systems cannot be realized in the related art and solve a problem of leakage of privacy data in a system (e.g., a security system) while sharing data among the systems, and further to realize communication between the security system and an ordinary system under the premise of ensuring that data in the security system has higher security.

The above mentioned descriptions are merely preferred embodiments of the present disclosure, and are not to limit the present disclosure. For persons skilled in the art, various changes or modifications may be made to the present disclosure. Any modification, equivalent, and improvement without departing from the spirit and scope of the present disclosure, should be within the protection scope of the present disclosure.

I claim:

1. A data sharing method for a terminal, which comprising a plurality of systems and a processor, the data sharing method comprising:

setting a data channel for communication between each two systems among the plurality of systems, and setting criteria for filtering data to be shared, the data channel being realized by a system broadcast, wherein the data channel set between each two systems among the plurality of systems comprises a public storage area;

when there is data to be shared between any two systems among the plurality of systems, the processor performing a security detection on the data to be shared through the data channel between the any two systems, and determining whether the data to be shared is security data, wherein the processor performs the security detection by filtering out data having security risks according to the criteria;

storing the data to be shared into the public storage area of the any two systems so the data to be shared is read by the any two systems;

determining whether the data channel between the any two systems is opened, wherein when the data channel between the any two systems is determined unopened, prohibiting sharing the data to be shared through the data channel between the any two systems, or sending a prompt to a user to open the data channel between the any two systems; and sharing the data to be shared through the data channel between the any two systems when the data to be shared is determined the security data, or prohibiting sharing the data to be shared through the data channel between the any two systems when the data to be shared is determined not the security data.

2. The data sharing method for the terminal of claim 1, wherein data without encryption is denied to be stored in the public storage area.

3. The data sharing method for the terminal of claim 1, wherein the public storage area comprises one or more of a public memory and public cloud storage space.

4. The data sharing method for the terminal of claim 1, before sharing the data to be shared through the data channel between the any two systems, further comprising:

encrypting the data to be shared.

5. A terminal, comprising:

at least one processor; and a storage device storing a plurality of instructions, which when executed by the processor, causes the at least one processor to:

set a data channel for communication between each two systems among the plurality of systems, and set criteria for filtering data to be shared, the data channel being realized by a system broadcast, wherein the data channel between each two systems among the plurality of systems comprises a public storage area;

perform a security detection on data to be shared through the data channel between any two systems when there is data to be shared between the any two systems among the plurality of systems, and determine whether the data to be shared is security data, the security detection comprising filtering out data having security risks according to the criteria;

store the data to be shared into the public storage area of the any two systems so the data is read by the any two systems;

determine whether the data channel between the any two systems is opened;

prohibit sharing the data to be shared through the data channel between the any two systems or prompt a user to open the data channel between the any two systems, when the at least one processor determines that the data channel between the any two systems is unopened; and share the data to be shared through the data channel between the any two systems when the data to be shared is determined the security data, or prohibit sharing the data to be shared through the data channel between the any two systems when the data to be shared is determined not the security data.

6. The terminal of claim 5, wherein the at least one processor denies storing data without encryption in the public storage area.

7. The terminal of claim 5, wherein the public storage area comprises one or more of a public memory and public cloud storage space.

8. The terminal of claim 5, wherein the at least one processor further:

encrypts the data to be shared before the at least one processor shares the data to be shared through the data channel between the any two systems.

9. A non-transitory storage medium having stored thereon instructions that, when executed by a processor of a terminal, causes the terminal to perform a data sharing method for the terminal, which comprising a plurality of systems, the data sharing method comprising:

setting a data channel for communication between each two systems among the plurality of systems, and setting criteria for filtering data to be shared, the data channel being realized by a system broadcast, wherein the data channel set between each two systems among the plurality of systems comprises a public storage area;

when there is data to be shared between any two systems among the plurality of systems, performing a security detection on data to be shared through the data channel between the any two systems by the processor, and determining whether the data to be shared is security data, wherein performing the security detection comprising filtering out data having security risks according to the criteria;

storing the data to be shared into the public storage area of the any two systems so the data is read by the any two systems;

determining whether the data channel between the any two systems is opened, wherein when the data channel between the any two systems is determined to be unopened, prohibiting sharing the data to be shared through the data channel between the any two systems, or prompting a user to open the data channel between the any two systems; and sharing the data to be shared through the data channel between the any two systems when the data to be shared is determined the security data, or prohibiting sharing the data to be shared through the data channel between the any two systems when the data to be shared is determined not the security data.

10. The non-transitory storage medium according to claim 9, wherein the public storage area comprises one or more of a public memory and public cloud storage space.

11. The non-transitory storage medium according to claim 9, before sharing the data to be shared through the data channel between the any two systems, wherein the data sharing method further comprises:
encrypting the data to be shared.

* * * * *